(12) United States Patent
Depardieu et al.

(10) Patent No.: US 10,000,426 B2
(45) Date of Patent: Jun. 19, 2018

(54) MARKING COATING

(71) Applicant: CORNING INCORPORATED, Corning, NY (US)

(72) Inventors: Melanie Emilie Celine Depardieu, Fromont (FR); David Henry, Fontaine le Port (FR)

(73) Assignee: Corning Incorporated, Corning, NY (US)

(*) Notice: Subject to any disclaimer, the term of this patent is extended or adjusted under 35 U.S.C. 154(b) by 134 days.

(21) Appl. No.: 15/009,094

(22) Filed: Jan. 28, 2016

(65) Prior Publication Data

US 2016/0145160 A1 May 26, 2016

Related U.S. Application Data

(63) Continuation of application No. 13/446,746, filed on Apr. 13, 2012, now abandoned.

(51) Int. Cl.
*C04B 38/00* (2006.01)
*B41M 5/00* (2006.01)
(Continued)

(52) U.S. Cl.
CPC ............ *C04B 41/83* (2013.01); *B41M 5/007* (2013.01); *B41M 5/0047* (2013.01); *B41M 5/26* (2013.01); *B41M 5/52* (2013.01); *B41M 5/529* (2013.01); *B41M 5/5218* (2013.01); *B41M 7/0054* (2013.01); *C04B 38/0006* (2013.01); *C09D 11/037* (2013.01); *C09D 11/102* (2013.01); *C09D 11/322* (2013.01); *C09D 183/04* (2013.01); *B41M 1/34* (2013.01); *B41M 5/262* (2013.01); *C08K 3/22* (2013.01); *C08K 2003/2241* (2013.01); *C08K 2201/005* (2013.01)

(58) Field of Classification Search
None
See application file for complete search history.

(56) References Cited

U.S. PATENT DOCUMENTS 3,477,869 A * 11/1969 Hathaway, Jr. .......... C08K 3/22
428/447
3,911,998 A * 10/1975 Domicone .............. C04B 41/83
428/447
(Continued)

FOREIGN PATENT DOCUMENTS

CA   2312400      5/2000
CN  101235229     8/2008
(Continued)

OTHER PUBLICATIONS

Ian A. Smallwood, Handbook of Organic Solvent Properties (1996).*
(Continued)

*Primary Examiner* — Nicholas W. Jordan

(57) ABSTRACT

A composition for allowing marking of a product, the composition comprising: (a) a volatile solvent; (b) a silicone resin comprising a trifunctional unit of formula $(R)SiO_{3/2}$, wherein R is chosen, independently by trifunctional unit, from hydrocarbyl groups and hydroxyl groups, on the condition that at least one R is a hydrocarbyl group; and, (c) titanium dioxide particles having an average size of between approximately 100 nanometers and 1000 nanometers.

23 Claims, 6 Drawing Sheets

(51) Int. Cl.

| | | |
|---|---|---|
| *C04B 41/83* | (2006.01) | |
| *B41M 5/26* | (2006.01) | |
| *B41M 5/52* | (2006.01) | |
| *C09D 183/04* | (2006.01) | |
| *C09D 11/037* | (2014.01) | |
| *C09D 11/102* | (2014.01) | |
| *C09D 11/322* | (2014.01) | |
| *B41M 7/00* | (2006.01) | |
| *B41M 1/34* | (2006.01) | |
| *C08K 3/22* | (2006.01) | |

(56) References Cited

U.S. PATENT DOCUMENTS

| | | | |
|---|---|---|---|
| 5,030,551 | A | 7/1991 | Herren et al. |
| 5,246,694 | A | 9/1993 | Birthwistle |
| 5,855,969 | A * | 1/1999 | Robertson ............ B41M 5/267 427/387 |
| 5,976,411 | A | 11/1999 | Feng et al. |
| 6,106,742 | A | 8/2000 | Argyropoulos et al. |
| 6,168,853 | B1 | 1/2001 | Feng et al. |
| 6,478,861 | B1 | 11/2002 | Kwan et al. |
| 6,803,087 | B2 | 10/2004 | Brew et al. |
| 6,835,457 | B2 | 12/2004 | Larson, Jr. et al. |
| 2003/0082413 | A1 | 5/2003 | Kume et al. |
| 2004/0034142 | A1 | 2/2004 | Kawakami et al. |
| 2004/0180011 | A1 | 9/2004 | Schlosser |
| 2004/0249039 | A1* | 12/2004 | Lamaze ............ C04B 35/62222 427/421.1 |
| 2006/0269722 | A1* | 11/2006 | Yamada ............ C04B 35/565 428/116 |
| 2008/0280064 | A1* | 11/2008 | Tokunaga ............ B41M 5/262 427/554 |
| 2009/0033005 | A1* | 2/2009 | Bookbinder ............ C04B 41/85 106/287.34 |
| 2009/0214458 | A1 | 8/2009 | Brun et al. |
| 2011/0224071 | A1* | 9/2011 | Okumura ............ C04B 41/009 501/88 |
| 2013/0011617 | A1 | 1/2013 | Tasaki et al. |

FOREIGN PATENT DOCUMENTS

| | | |
|---|---|---|
| CN | 101531864 | 9/2009 |
| EP | 0391848 | 10/1990 |
| EP | 0854761 | 3/2002 |
| EP | 1375590 | 1/2004 |
| EP | 1967380 | 9/2008 |
| JP | 06108000 A | 4/1994 |
| JP | 06125513 A | 5/1994 |
| JP | 2000327980 A | 11/2000 |
| JP | 2002121484 A | 4/2002 |
| JP | 2002283729 A * | 10/2002 |
| JP | 2004-51709 | 2/2004 |
| JP | 2004-51710 | 2/2004 |
| JP | 04267914 | 5/2009 |
| KR | 697977 | 3/2007 |
| WO | 1997047397 | 12/1997 |
| WO | 1999031171 | 6/1999 |
| WO | 2001000419 | 1/2001 |
| WO | 2005075567 | 8/2005 |
| WO | 2011118108 | 9/2011 |

OTHER PUBLICATIONS

English Translation of JP2015505797 Office Action dated Mar. 17, 2017, Japan Patent Office.

Sakai GTR-100 product data sheet, no date [retrieved on May 28, 2015]. Retrieved from the internet < URL: http:/www.sakai-chem.co.jp/en/products/pdf/chitan_gtr100.pdf>.

Patent Cooperation Treaty International Notification of Transmittal of the International Search Report and the Written Opinion of the International Searching Authority, international application No. PCT/US2013/035192; dated Jun. 20, 2013, 11 pages.

Chinese application No. 201380019805.4, dated Sep. 29, 2015, Notice on the First Office Action (PCT Application in the National Phase), 6 pages.

* cited by examiner

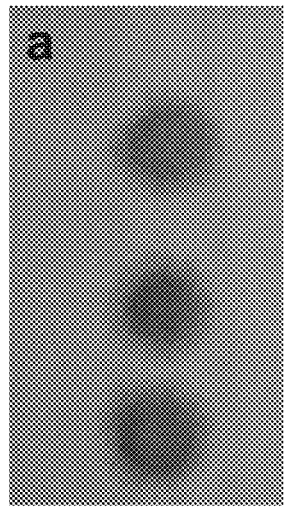 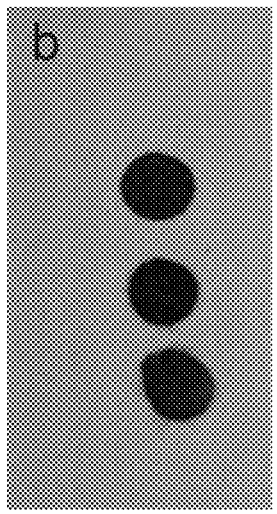
FIG. 6a  FIG. 6b
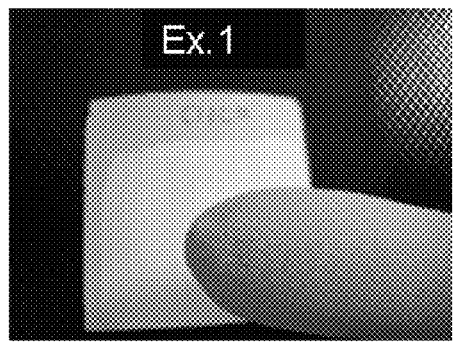 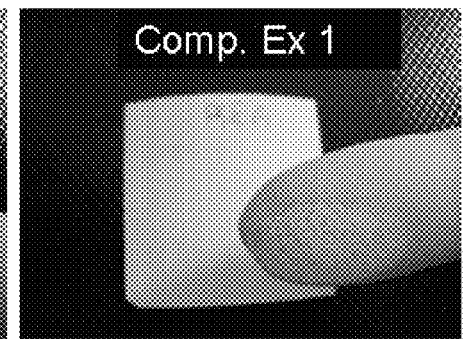
FIG. 7a  FIG. 7b

MARKING COATING

CROSS-REFERENCE TO RELATED APPLICATIONS

This application is a continuation of U.S. patent application Ser. No. 13/446,746 filed on Apr. 13, 2012, the content of which is relied upon and incorporated herein by reference in its entirety, and the benefit of priority under 35 U.S.C. § 120 is hereby claimed.

FIELD OF THE DISCLOSURE

The present disclosure is directed to marking of structures and, more specifically, relates to compositions and methods of marking structures exposed to high temperature as well as the resulting marked structures.

BACKGROUND

Ceramic honeycomb structures are widely used as antipollutant devices in exhaust systems of automotive vehicles, both as catalytic converter substrates in automobiles and diesel particulate filters in diesel-powered vehicles. After being extruded and fired, the finished ceramic structures may be subjected to a coating process that coats the gas contacting surfaces with a washcoat, possibly containing catalytic metals.

Before entering the wash coat process, one may create a mark onto the ceramic honeycomb for identification and to ensure traceability of the article all along the process flow. This mark may be printed in the form of a bar code, such as a two-dimensional data matrix barcode that includes manufacturing information relating to the process steps seen by the honeycomb.

Exemplary marking methods include laser marking and inkjet printing using a heat resistant ink or coating. To the extent a printed mark is created on the honeycomb, the honeycomb thereafter undergoes catalyst coating and heat treatment. Generally, the honeycomb bodies may be subjected to additional heating steps in which the honeycombs are fired again to a lower temperature, e.g., at 300° C. to 700° C. Accordingly, it is desired to develop a coating for marking which is not deteriorated by chemical and/or heat treatment.

SUMMARY

Generally speaking, the present disclosure relates to a high contrast, permanent marking composition that is stable and does not undergo discoloration upon heating. The compositions of the exemplary disclosure may comprises a $TiO_2$ pigment, such as in the rutile crystalline form and having average size between 100 and 1,000 nanometers, a volatile solvent, and a silicone resin having at least one trifunctional unit of the formula $(R)SiO_{3/2}$, wherein R is chosen, independently by trifunctional unit, from hydrocarbyl groups and hydroxyl groups, on the condition that at least one R is a hydrocarbyl-based group.

It is believed that the use of a silicone resin having at least one trifunctional unit of the formula $(R)SiO_{3/2}$ as a binder and a volatile organic solvent permits marking of the eventual coating composition without requiring a separate drying or curing step between application of the coating and marking on the coating. By obviating a separate coating curing step, very short cycle times and higher throughputs may be achieved. By way of example, an exemplary coating of the instant disclosure may be applied and marked upon in a total time of less than ten seconds at room temperature. This cycle time is in stark contrast to the silicon emulsion compositions disclosed in U.S. Pat. No. 5,855,969 that require a dedicated curing step (e.g., five minutes at 800° F.).

The exemplary coatings of the present disclosure comprise relatively small titanium dioxide ($TiO_2$) particles that may allow the coating to partly diffuse into the porosity of the intended structure (e.g., a ceramic honeycomb, see FIG. 9) and thus allow intimate fusion of the coating material with a ceramic substrate when exposed to infrared laser radiation. In contrast, platelet-like coated micas as disclosed in U.S. Pat. No. 5,855,969 having an aspect ratio greater than 10 and an average particle size greater than 1000 nanometers are outside of the scope of the disclosure because particles of these dimensions are not able to diffuse efficiently into the pores of the porous structures such as a ceramic honeycomb structure. FIG. 8 shows a scanning electron microscope cross section of a ceramic substrate and a coating after laser marking where the coating was formulated in accordance with the instant disclosure with the exception of utilizing $TiO_2$ stacked mica platelets instead of the small $TiO_2$ particles. The superficial laser marking occurred only within the top layers of stacked mica platelets, thus preventing efficient diffusion into the porosity of the ceramic substrate.

The exemplary coatings of the instant disclosure may be applied by various means including, without limitation, pad printing, spraying, screen printing, inkjet printing, drop-on-demand (DOD) printing.

While not every exemplary coating in accordance with the instant disclosure includes all of the foregoing advantages, a series of advantages associated with the exemplary coatings is discussed in more detail hereafter. It should be understood, however, that whether or not a coating has one or more of the foregoing advantages does not necessarily include or exclude the coating from the scope of the instant disclosure. A first exemplary advantage that may be exhibited by a coating formulated in accordance with the instant disclosure is that the coating composition does not undergo discoloration (darkening) upon heating, thereby preventing illegibility issues when the coating is used to create a data matrix barcode. A second exemplary advantage that may be exhibited by a coating formulated in accordance with the instant disclosure is that the coating provides a highly opaque and uniform background allowing a high color contrast for easier reading. A third exemplary advantage that may be exhibited by a coating formulated in accordance with the instant disclosure is that the coating composition resists turning chalky when heated, which makes the ultimate marking resistant to rubbing and enables an accurate traceability of the substrate. A fourth exemplary advantage that may be exhibited by a coating formulated in accordance with the instant disclosure is that the coating does not require a dedicated curing step, but instead is able to dry at ambient conditions within few seconds (e.g., less than five seconds). A fifth exemplary advantage that may be exhibited by a coating formulated in accordance with the instant disclosure is that the coating may be marked by a carbon dioxide ($CO_2$) laser and is compatible with common ink-jet printing techniques without resulting in smearing of the ink. A sixth exemplary advantage that may be exhibited by a coating formulated in accordance with the instant disclosure is that the coating becomes fused to a ceramic honeycomb structure to make any mark using the coating permanent.

It is a first aspect of the present disclosure to provide a composition for allowing marking of a product, the composition comprising: (a) a volatile solvent; (b) a silicone resin comprising a trifunctional unit of formula $(R)SiO_{3/2}$, wherein R is chosen, independently by trifunctional unit, from hydrocarbyl groups and hydroxyl groups, on the condition that at least one R is a hydrocarbyl group; and, (c) titanium dioxide particles having an average size of between approximately 100 nanometers and 1000 nanometers.

In a more detailed embodiment of the first aspect, the composition further includes at least one of a dispersing agent, a wetting agent, a humectant, an anti-settling agent, a ultraviolet tracer, and a surfactant. In yet another more detailed embodiment, the titanium dioxide particles exhibit at least one of a white color and a red color. In a further detailed embodiment, the titanium dioxide particles comprise rutile crystalline titanium dioxide particles. In still a further detailed embodiment, the titanium dioxide particles have an average size of between approximately 200 nanometers and 300 nanometers. In a more detailed embodiment, the titanium dioxide particles have an oil absorption number higher than 30 grams of oil per 100 grams of titanium dioxide particles. In a more detailed embodiment, the volatile solvent comprises at least one of an alkanol, an ester, a ketone, a polyol, an ether, and an alcohol. In another more detailed embodiment, the volatile solvent comprises between 10 weight percent and 90 weight percent of the composition. In yet another more detailed embodiment, the volatile solvent comprises between 40 weight percent and 80 weight percent of the composition.

In yet another more detailed embodiment of the first aspect, the volatile solvent comprises between 50 weight percent and 70 weight percent of the composition. In still another more detailed embodiment, the composition further includes a lesser volatile solvent having a vapor pressure an order of magnitude less than the volatile solvent. In a further detailed embodiment, the composition is resistant to discoloration at temperatures greater than 350° C.

It is a second aspect of the present disclosure to provide a method of marking an object, the method comprising: (a) producing a coating formulated from: (i) a volatile solvent, (ii) a silicone resin comprising a trifunctional unit of formula $(R)SiO_{3/2}$, wherein R is chosen, independently by trifunctional unit, from hydrocarbyl groups and hydroxyl groups, on the condition that at least one R is a hydrocarbyl group, and, (iii) titanium dioxide particles having an average size of between approximately 100 nanometers and 1000 nanometers; (b) applying the coating to an object; and, (c) creating an indicia where the coating was applied.

In a more detailed embodiment of the second aspect, the step of applying the coating to the object includes diffusing the coating into the object prior to the step of creating the indicia, the object comprises a ceramic substrate, and the coating is resistant to discoloration at temperatures greater than 350° C. In yet another more detailed embodiment, the ceramic substrate comprises a porous cordierite having a honeycomb shape. In a further detailed embodiment, the step of creating the indicia where the coating was applied includes using laser marking to create the indicia, and the laser marking is carried out using at least one of a carbon dioxide laser, an infrared laser, and an ultraviolet laser. In still a further detailed embodiment, the step of applying the coating and the step of creating the indicia are collectively performed in under thirty seconds. In a more detailed embodiment, the step of applying the coating to the object includes at least two of pad printing, spraying, inkjet printing, laser marking, and screen printing the coating to the object. In a more detailed embodiment, the step of producing the coating includes adding at least one of a dispersing agent, a wetting agent, a humectant, an anti-settling agent, a ultraviolet tracer, and a surfactant to the volatile solvent, silicone resin, and titanium dioxide particles. In another more detailed embodiment, the step of producing the coating includes adding a lesser volatile solvent to the volatile solvent, silicone resin, and titanium dioxide particles, and the lesser volatile solvent has a vapor pressure an order of magnitude less than the volatile solvent.

BRIEF DESCRIPTION OF THE DRAWINGS

FIG. 6a shows a series of ink droplets smearing on a coating formulated according to Example 6 where titanium dioxide coated mica platelets were used.

FIG. 6b shows a series of ink droplets not smearing on coating formulated according to Example 3 where titanium dioxide particles were used.

FIG. 7a shows the absence of "chalking" after firing at 500° C. for 30 min for a coating formulated according to Example 1.

FIG. 7b shows strong "chalking" after firing at 500° C. for 30 min for a coating formulated according to Example 5.

DETAILED DESCRIPTION

Figure 1:
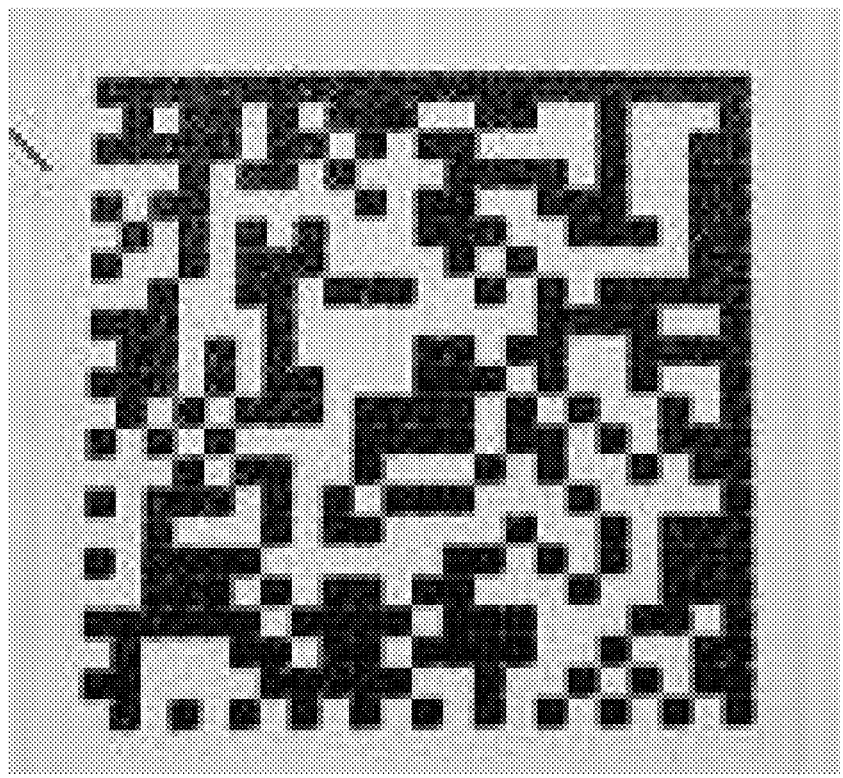
FIG. 1 is a typical 2D data matrix mark created using a 30W $CO_2$ laser applied to a coating composition formulated in accordance with the present disclosure and coated on a ceramic honeycomb substrate.

The exemplary embodiments of the present disclosure are described and illustrated below to encompass marking of structures and, more specifically, relates to compositions and methods of marking structures exposed to high temperature as well as the resulting marked structures. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

The exemplary compositions disclosed herein contain at least one silicone resin, at least one volatile solvent, and titanium dioxide particles. In addition to the foregoing components, one or more high boiling point solvents and additives may comprise part of the exemplary compositions.

As used herein, the term "silicone resin" means a crosslinked or non-crosslinked three-dimensional structure incorporating silicone. The nomenclature of silicone resins is known under the name MDTQ, the resin being described as a function of the various siloxane monomer units it comprises, each of the letters MDTQ characterizing a type of unit. The letter M represents the monofunctional unit, for example, of formula $(CH_3)_3SiO_{1/2}$, the silicon atom being connected to only one oxygen atom in the polymer comprising this unit. The letter D means a difunctional unit, for example, $(CH_3)_2SiO_{2/2}$, in which the silicon atom is connected to two oxygen atoms. The letter T represents a trifunctional unit, for example, of formula $(CH_3)SiO_{3/2}$.

In the M, D, and T units listed as examples above, at least one of the methyl groups may be substituted. In some embodiments, the at least one silicone resin comprising at least one trifunctional unit of formula $(R)SiO_{3/2}$ is chosen from the silsesquioxanes of formula: $((R')SiO_{3/2})_x$, in which "x" ranges from 100 to 500 and R' is chosen, independently by trifunctional unit, from a hydrocarbon-based group containing from 1 to 10 carbon atoms or a hydroxyl group, on the condition that at least one R' is a hydrocarbon-based group. In some embodiments, the hydrocarbon-based group containing from 1 to 10 carbon atoms is a methyl group. In some embodiments, the at least one silicone resin comprising at least one trifunctional unit of formula $(R)SiO_{3/2}$ is chosen from the silsesquioxanes of the formula: $((R')SiO_{3/2})_x$, in which "x" ranges from 100 to 500 and R' is chosen, independently by unit, from $CH_3$, a hydrocarbon-based group containing from 2 to 10 carbon atoms, or a hydroxyl group, on the condition that at least one R' is a hydrocarbon-based group. Finally, the letter Q means a tetrafunctional unit $SiO_{4/2}$ in which the silicon atom is bonded to four hydrogen atoms, which are themselves bonded to the rest of the polymer.

Various resins with different properties may be obtained from these different units, the properties of these polymers varying as a function of the type of monomers (or units), of the type and number of substituted groups, of the length of the polymer chain, of the degree of branching and of the size of the side chains. The silicone resin contains at least one T unit. It may thus be, for example, a T, MT, MTQ or MDTQ resin. In some embodiments, the unit composition of the silicone resin is at least 50% T units, or at least 80% T units. In some embodiments, the T resins may contain M, D and Q units such that at least 80 mol % or at least 90 mol %, relative to the total amount of silicones, are T units. The T resins may also contain hydroxyl and/or alkoxy groups. The T resins may have a total weight of hydroxyl functions ranging from 2% to 10% and a total weight of alkoxy functions that may be up to 20%; in some embodiments, the total weight of hydroxyl functions ranges from 4% to 8% and the total weight of alkoxy functions may be up to 10%.

The silicone resin may be chosen from silsesquioxanes that are represented by the following formula: $((CH_3)SiO_{3/2})_x$, in which x may be up to several thousand and the $CH_3$ group may be replaced with an R group, as described previously in the definition of the T units. The number x of T units of the silsesquioxane may be less than or equal to 500, or it may range from 50 to 500. The molecular weight of the silicone resin may range from 500 to 50,000 g/mol, from 500 to 20,000 g/mol, or from 500 to 10,000 g/mol. As examples of these silicone resins containing at least one T unit, mention may be made of: (a) polysilsesquioxanes of formula $((R)SiO_{3/2})_x$ (T units) in which x is greater than 100, in which the R groups may independently be methyl or other substituents as defined above; (b) polymethylsilsesquioxanes, which are polysilsesquioxanes in which R is a methyl group. Such polymethylsilsesquioxanes are described, for example, in U.S. Pat. No. 5,246,694 that is incorporated herein by reference; (c) polypropylsilsesquioxanes, in which R is a propyl group. These compounds and their synthesis are described, for example, in patent application WO 2005/075567 that is incorporated herein by reference; (d) polyphenylsilsesquioxanes, in which R is a phenyl group. These compounds and their synthesis are described, for example, in patent application US 2004/0180011 that is incorporated herein by reference. Examples of commercially available polymethylsilsesquioxane resins that may be utilized include those sold: (a) by the company Wacker under the reference Resin MK such as Belsil PMS MK: polymer comprising $CH_3SiO_{3/2}$ repeating units (T units), which may also comprise up to 1% by weight of $(CH_3)_2SiO_{2/2}$ units (D units) and having an average molecular weight of about 10,000 g/mol; and, (b) by the company Shin-Etsu under the references KR-220L, which are composed of T units of formula $CH_3SiO_{2/2}$ and have Si—OH (silanol) end groups, under the reference KR-242A, which comprise 98% of T units and 2% of dimethyl D units and have Si—OH end groups or alternatively under the reference KR-251 comprising 88% of T units and 12% of dimethyl D units and have Si—OH end groups. Examples of commercially available polypropylsilsesquioxane resins that may be mentioned include those sold by the company Dow Corning under the reference Dow Corning 670 Fluid, which is a polypropylsilsesquioxane diluted in D5.

The composition may comprise a plurality of types of silicone resins comprising at least one T unit. The at least one silicone resin comprising at least one T unit may be present in the composition in a concentration ranging from 0.1% to 20%, from 0.2% to 15%, or from 0.5% to 10%. In some embodiments, the weight ratio of (1) the at least one silicone resin comprising the at least one trifunctional unit of formula $(R)SiO_{3/2}$, to (2) the at least one volatile solvent ranges from 1/200 to 1/10.

Optionally, the silicone resin may comprise at least one trifunctional unit of formula $(R)SiO_{3/2}$ blended with an MQ resin. For example, Dow Corning® MQ-1640 Flake Resin is a blend of MQ (Trimethylsiloxy silicate) and T propyl silicone resin (Polypropyl silsesquioxane). For example, such a Trimethylsiloxy silicate resins are sold under the reference SR1000 by General Electric or under the reference TMS 803 by Wacker Exemplary commercially available TD resin includes Dow Corning® 249 Flake resin comprising phenyl and methyl silsesquioxanes and methyl siloxanes.

Examples of useful resins include Dow Corning® 217, Dow Corning® 220 (phenyl/methyl ratio is 2.0), Dow Corning® 233 (phenyl/methyl ratio is 1.3), Dow Corning® 249 (phenyl/methyl ratio is 0.6), Dow Corning® 255 phenyl/methyl ratio is 0.84) the list being not limitative.

Optionally a blend of T resin and TD resin comprising phenyl substituents is used. Useful blend may be made by blending polymethylsilsesquioxane resins with polysilsesquioxanes resins comprising phenyl and methyl groups. For example a blend comprising Dow Corning® 249 Flake resin and Belsil PMS MK is particularly useful.

The silicone resin may be contained in an amount ranging from 10 to 90% by volume, preferably 40 to 80% by volume, more preferably from 55 to a 75% by volume, based on the total solid content (nonvolatile material).

As discussed previously, the exemplary compositions include at least one volatile solvent. As used herein, the term "volatile solvent" means a compound that is liquid at room temperature (20° C.) and at atmospheric pressure (760 mmHg), with a vapor pressure at 20° C. of greater than 1.0 mmHg. In some embodiments, the vapor pressure at 20° C. of the volatile solvent may range from 1.0 to 300 mmHg, or from 1.0 to 200 mmHg.

The volatile solvent may be chosen from non-silicone organic solvents and silicon organic solvents. Volatile non-silicone organic solvents that may be mentioned include: (a) volatile $C_1$-$C_4$ alkanols such as ethanol or isopropanol; (b) volatile $C_5$-$C_7$ alkanes such as n-pentane, hexane, cyclopentane, 2,3-dimethylbutane, 2,2-dimethylbutane, 2-methylpentane or 3-methylpentane; (c) esters of liquid $C_1$-$C_{20}$ acids and of volatile $C_1$-$C_8$ alcohols such as methyl acetate, n-butyl acetate, ethyl acetate, propyl acetate, isopentyl acetate or ethyl 3-ethoxypropionate; (d) ketones that are liquid at room temperature and volatile, such as methyl ethyl ketone, methyl isobutyl ketone, diisobutyl ketone, isophorone, cyclohexanone or acetone; (e) volatile polyols such as propylene glycol; (f) volatile ethers such as dimethoxymethane, diethoxyethane or diethyl ether; (g) volatile glycol ethers such as 2-butoxyethanol, butyl diglycol, diethylene glycol monomethyl ether, propylene glycol n-butyl ether or propylene glycol monomethyl ether acetate; (h) volatile hydrocarbon-based oils such as, for example, volatile hydrocarbon-based oils containing from 8 to 16 carbon atoms, and mixtures thereof, and branched $C_8$-$C_{16}$ alkanes, for instance $C_8$-$C_{16}$ isoalkanes (also known as isoparaffins), isododecane, isodecane and, for example, the oils sold under the trade names Isopar or Permethyl, and mixtures thereof. Mention may also be made of isohexyl or isodecyl neopentanoate; (i) volatile $C_4$-$C_{10}$ perfluoroalkanes such as dodecafluoropentane, tetradecafluorohexane or decafluoropentane; (j) volatile perfluorocycloalkyls such as perfluoromethylcyclopentane, 1,3-perfluorodimethylcyclohexane and perfluorodecalin, sold, respectively, under the names Flutec PC1, Flutec PC3 and Flutec PC6 by the company F2 Chemicals, and also perfluorodimethylcyclobutane and perfluoromorpholine; (k) volatile fluoroalkyl or heterofluoroalkyl compounds corresponding to the following formula: $CH_3$—$(CH_2)_n[Z]_t$—$X$—$CF_3$, in which t is 0 or 1; n is 0, 1, 2 or 3; X is a linear or branched divalent perfluoroalkyl group containing from 2 to 5 carbon atoms, and Z represents O, S or NR, R being a hydrogen atom or a group —$(CH_2)_n$—$CH_3$ or a group —$(CF_2)_m$—$CF_3$, m being 2, 3, 4 or 5.

The volatile solvent may be present in the composition in a content ranging from 10% to 90% by weight, from 40% to 80% by weight, or from 50% to 70% by weight, relative to the total weight of the composition.

As discussed above, the exemplary compositions include titanium dioxide particles. As used herein, titanium dioxide particles means crystalline rutile titanium dioxide having an aspect ratio not greater than 10. In exemplary form, the titanium dioxide particles have an average particle size below 1,000 nanometers and may even have an average particle size below 300 or 200 nanometers. Exemplary titanium dioxide particles that may be used in the exemplary compositions include, without limitation, Tioxide TR-50 (Alumina, Silica and organic surface treatment), Tioxide TR-92 (alumina, zircona and organic surface treatment) and Tioxide RH-D2 (alumina and organic surface treatment) from Huntsman, Tiona 595 ($Al_2O_3$, $ZrO_2$ and organic surface treatment) from Millennium Inorganic Chemicals.

It has been found that platelet-shaped titanium dioxide coated micas are specifically outside of the scope of the intended titanium dioxide particles. In particular, platelet-shaped titanium dioxide coated micas do not diffuse efficiently into the porosity of certain substrates, such as ceramic honeycomb substrates. It has also been found that platelet-shaped titanium dioxide coated micas result in smearing of ink when marking is attempted on the coating. Consequently, platelet-shaped titanium dioxide coated micas are not within the scope of the titanium dioxide particles that comprise at least a portion of the exemplary compositions.

Pigments are also characterized by their oil absorption number. Pigments having a high enough oil absorption number allow quick absorption of an ink solvent and thus secure the dye at the surface leading to decreased ink spreading and quicker ink drying. The result is a print with good definition. The oil absorption number is preferably above 20 g/100 g and more preferably above 30 g/100 g in order to reduce discoloration and to prevent smearing of ink when applied to the exemplary composition of the instant disclosure.

It is also within the scope of the disclosure to use titanium dioxide particles having inorganic or organic surface treatments that may provide improvements in one or more important performance properties such as dispersibility in water and in organic liquids, hiding power efficiency, chalk resistance, and resistance to discoloration by heat. Exemplary inorganic surface modifiers include, without limitation, precipitated coatings of alumina, zirconia and silica.

As discussed previously, the exemplary composition may include one or more high boiling point solvents. As used herein, a high boiling point solvent means any solvent that has a vapor pressure at 20° C. of less than 0.1 mmHg. Although some exemplary compositions may be formulated to dry very quickly, it may be useful to retard the evaporation rate of the solvents in order to improve impregnation of the composition into the intended substrate, such as the porous skin of a ceramic honeycomb structure. Examples of high boiling point solvents include, without limitation, alkyl esters ranging through methyl to hexyl esters and glycol ether acetates such as glycolic acid-n-butyl ester.

As discussed previously, the exemplary composition may include one or more additives. As used herein, an additive includes, without limitation, dispersing agents, wetting agents, humectants, anti-settling agents, and ultraviolet fluorescent tracers. Examples of suitable dispersants include, but are not limited to, dispersants sold by Buckman Laboratories under the Busperse trademark, dispersants sold by Byk under the Disperbyk trademark, dispersants sold by Lubrizol under the Solsperse trademark, dispersants sold by BASF under the EFKA trademark, dispersants sold by Kyoeisha Chemical Co. under the Flowlen trademark, dipersants sold by Ajinomoto under the Ajisper trademark, dispersants sold by Cognis under the Texaphor trademark, dispersants sold by Cytec Industries under the Aerosol trademark, dispersants sold by Ethox chemicals, dispersants sold by San Nopko, dispersants sold by Kusumoto Chemical under the Disparlon trademark and dipersants sold by Evonik under the Tego trademark.

A series of coating compositions were formulated as indicated in Table 1.

TABLE 1

| | Ex. 1 | Ex. 2 | Ex. 3 | Ex. 4 | Ex. 6 | Ex. 7 |
|---|---|---|---|---|---|---|
| WackerBelsilPMS MK | 7.10 | 2.93 | 2.93 | 2.93 | 2.93 | 2.93 |
| Dow Corning 249 Flake resin | 0 | 8.85 | 8.85 | 8.85 | 8.85 | 8.85 |
| 2-Butanone | 63.90 | 60.65 | 60.65 | 60.65 | 60.65 | 60.65 |
| Butyl Glycolate | 7.10 | 6.75 | 6.75 | 6.75 | 6.75 | 6.75 |

TABLE 1-continued

|  | Ex. 1 | Ex. 2 | Ex. 3 | Ex. 4 | Ex. 6 | Ex. 7 |
|---|---|---|---|---|---|---|
| DisperBYK181 | 0.6 | 0.6 | 0.6 | 0.6 | 0.6 | 0.6 |
| TionaRL-90 | 21.30 | 0 | 0 | 0 | 0 | 0 |
| Tiona595 | 0 | 20.22 | 0 | 0 | 0 | 0 |
| TioxideTR50 | 0 | 0 | 20.22 | 0 | 0 | 0 |
| TioxideTR92 | 0 | 0 | 0 | 20.22 | 0 | 0 |
| Iriodin111 | 0 | 0 | 0 | 0 | 20.22 | 0 |
| TionaDT-50 (anatase) | 0 | 0 | 0 | 0 | 0 | 20.22 |

Example 1

The following composition was produced:

| Composition #1 | |
|---|---|
| Wacker Belsil PMS MK | 7.10 grams |
| 2-Butanone | 63.90 grams |
| Butyl Glycolate | 7.10 grams |
| DisperBYK 181 | 0.6 grams |
| Tiona RL-90 | 21.30 grams |

Initially, the 2-butanone was mixed with the Wacker Belsil PMS MK in order to dissolve the silicone resin. Thereafter, butyl glycolate, DisperBYK 181, and Tiona RL-90 was added to the precursor mixture. The resulting formulation was mixed at 15,000-20,000 rpm for 5-10 minutes using an Ultra Turrax disperser.

After mixing, the resulting formulation was applied to the exterior skin of a cordierite honeycomb using a drop-on-demand REA-JET printing system equipped with a 32-dot print heat at a pressure of 0.5-0.7 bar. A more detailed discussion of the cordierite honeycomb structure is found in U.S. Pat. No. 6,803,087, the disclosure of which is incorporated herein by reference. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D DataMatrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

FIG. 7a shows the absence of "chalking" after firing at 500° C. for 30 min for this exemplary coating. Compare this result to the result shown in FIG. 7b where strong "chalking" is shown for the coating of Example 5.

Example 2

The following composition was produced:

| Composition #2 | |
|---|---|
| Wacker Belsil PMS MK | 2.93 grams |
| Dow Corning 249 Flake Resin | 8.85 grams |
| 2-Butanone | 60.65 grams |
| Butyl Glycolate | 6.75 grams |
| DisperBYK 181 | 0.6 grams |
| Tiona 595 | 20.22 grams |

Initially, the 2-butanone was mixed with the Wacker Belsil PMS MK and Dow Corning 249 Flake Resin in order to dissolve the silicone resin. Thereafter, butyl glycolate, DisperBYK 181, and Tiona 595 was added to the precursor mixture. The resulting formulation was mixed at 15,000-20,000 rpm for 5-10 minutes using an Ultra Turrax disperser.

After mixing, the resulting formulation was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D DataMatrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

Example 3

The following composition was produced:

| Composition #3 | |
|---|---|
| Wacker Belsil PMS MK | 2.93 grams |
| Dow Corning 249 Flake Resin | 8.85 grams |
| 2-Butanone | 60.65 grams |
| Butyl Glycolate | 6.75 grams |
| DisperBYK 181 | 0.6 grams |
| Tioxide TR50 | 20.22 grams |

Initially, the 2-butanone was mixed with the Wacker Belsil PMS MK and Dow Corning 249 Flake Resin in order to dissolve the silicone resin. Thereafter, butyl glycolate, DisperBYK 181, and Tioxide TR50 was added to the precursor mixture. The resulting formulation was mixed at 15,000-20,000 rpm for 5-10 minutes using an Ultra Turrax disperser.

Figure 2:
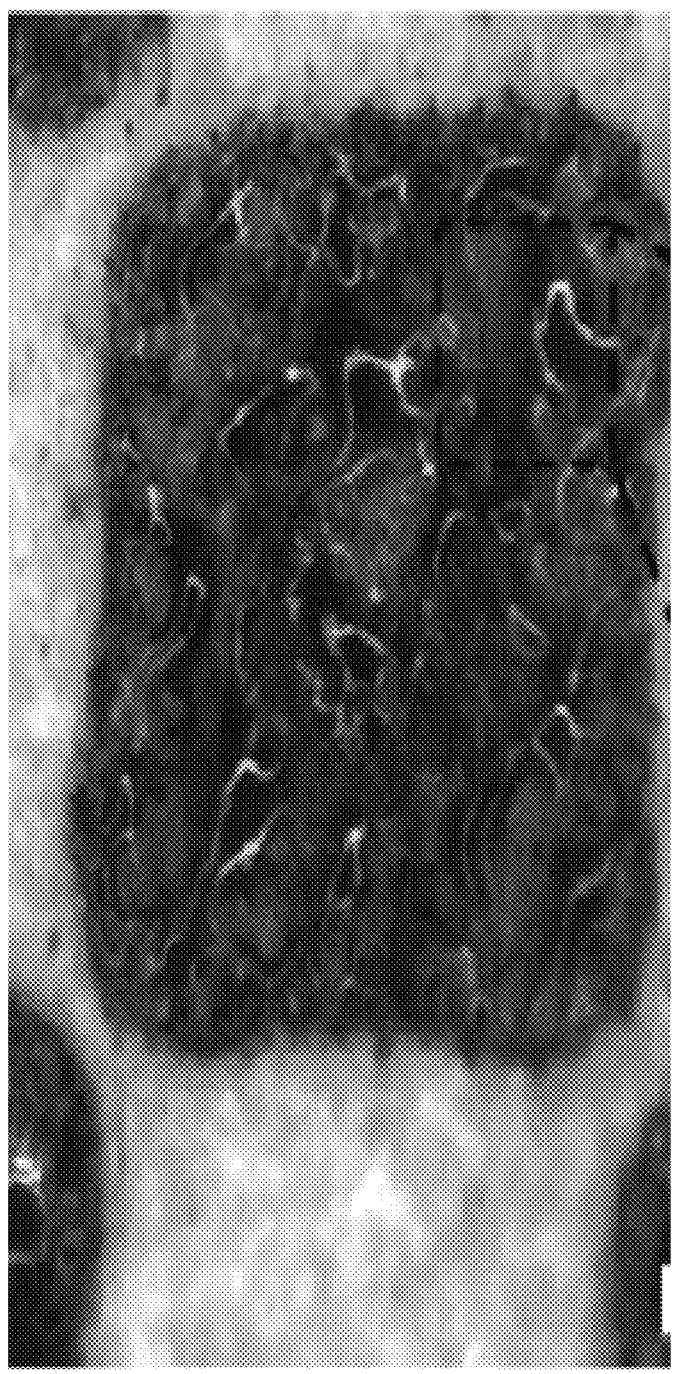
FIG. 2 is a magnified view of a single dot from the 2D data matrix of FIG. 1.

After mixing, the resulting formulation was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. FIG. 1 shows an image of the data matrix mark. FIG. 2 shows a magnified view of a single dot from the 2D data matrix of FIG. 1.

Figure 3:
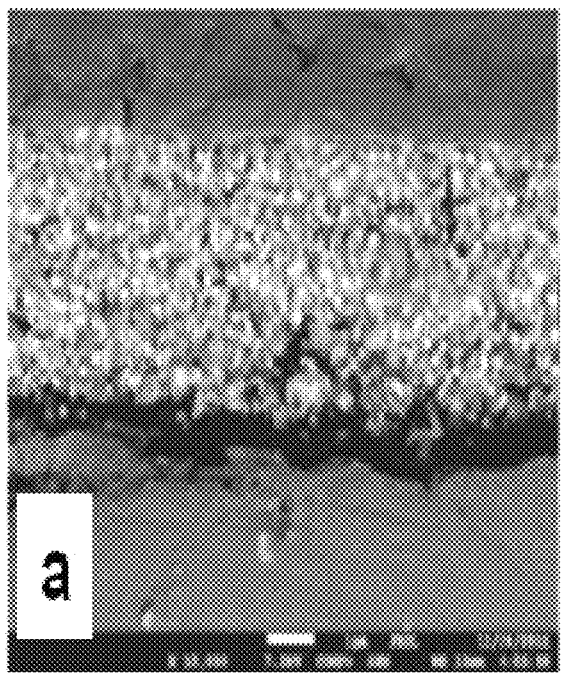
FIG. 3 is a scanning electron microscope image of a portion of the white background (the titanium dioxide particles not exposed to the laser are clearly visible) of FIG. 1.
Figure 4:
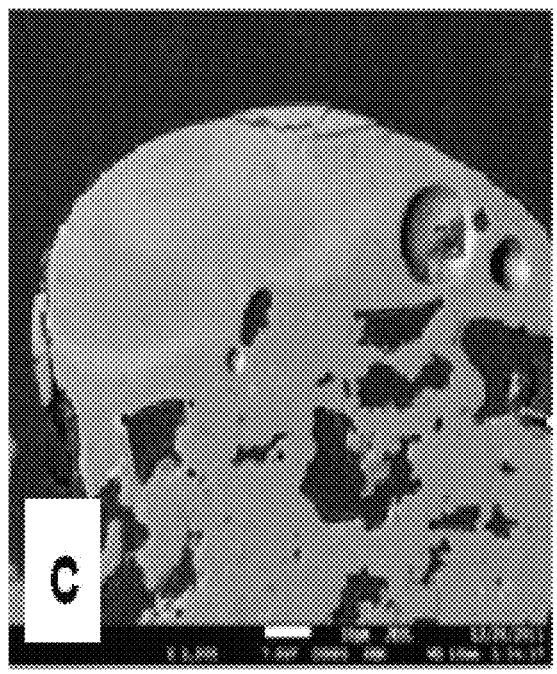
FIG. 4 is a scanning electron microscope image of a portion of the single dot of FIG. 2 showing that the coating was fused with the honeycomb substrate and the titanium dioxide particles are no longer visible.
Figure 5:
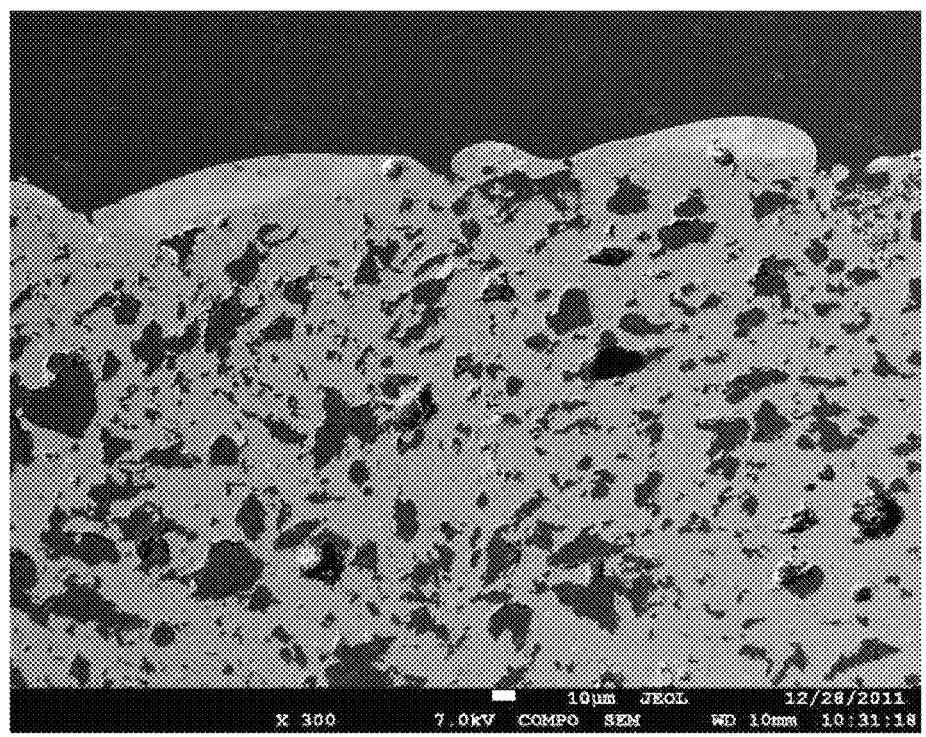
FIG. 5 is a cross section view showing the fused coating on top of the ceramic honeycomb substrate.
Figure 8:
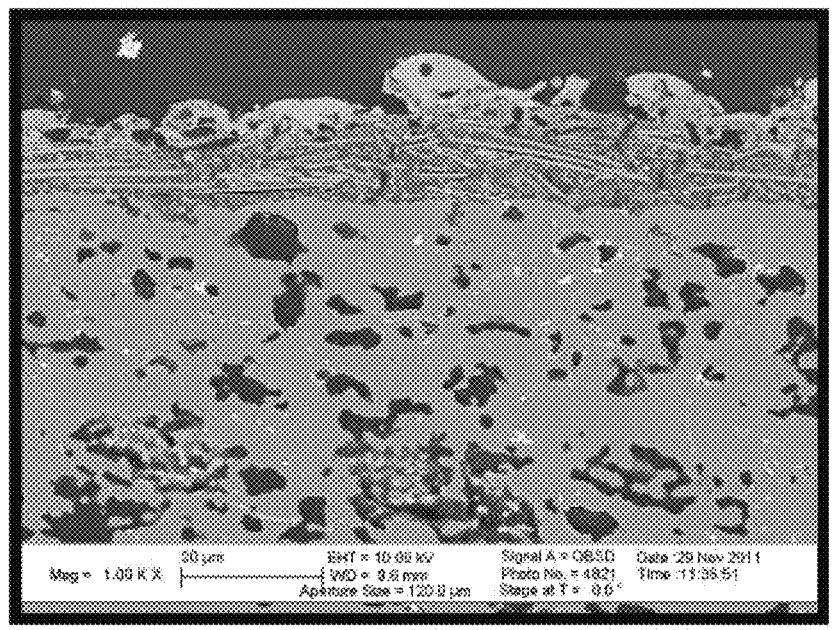
FIG. 8 shows a scanning electron microscope image of a cross section illustrating the surface coating using titanium dioxide coated mica platelets where the superficial laser marking occurred only within the first top layers of stacked mica platelets, thus preventing efficient fusion with the substrate.
Figure 9:
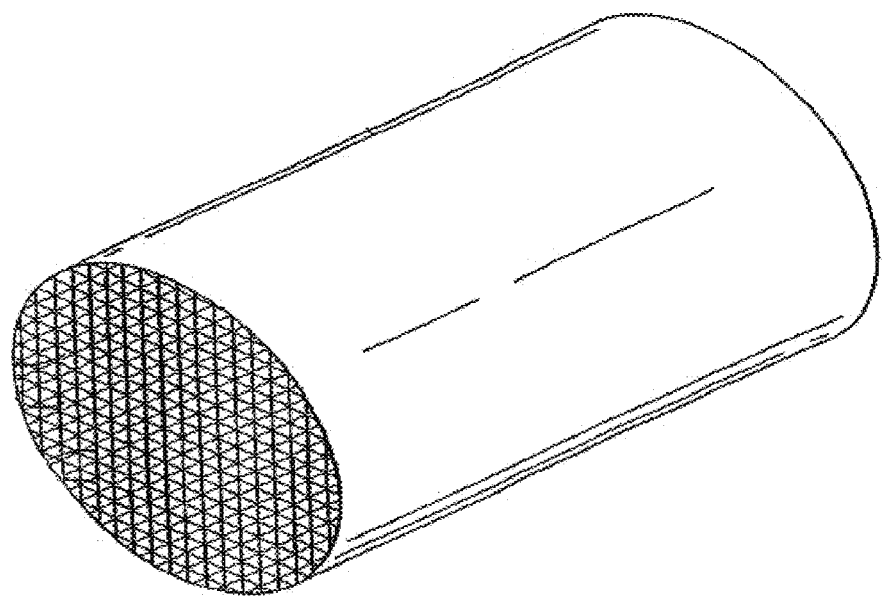
FIG. 9 is an elevated perspective view of a porous ceramic honeycomb structure upon which exemplary coatings in accordance with the present disclosure may be deposited.

The irradiated portions of the coating developed a dark (black) color and extremely good color contrast between the irradiated and non-irradiated portion. FIG. 3 shows a scanning electron microscope image of a portion of the white background (the titanium dioxide particles not exposed to the laser are clearly visible) of FIG. 1. The resulting laser mark was fused within the cordierite and had an approximate thickness of less than 30 µm. FIG. 4 shows a scanning electron microscope image of a portion of the single dot of FIG. 2 where the coating was fused with the honeycomb substrate and the titanium dioxide particles are no longer visible. FIG. 5 shows a scanning electron microscope image across the single dot of FIG. 2 where the coating was fused with the honeycomb substrate and the titanium dioxide particles are no longer visible.

Likewise, a drop-on-demand REA-JET printing system equipped with a 32-dot print heat at a pressure of 0.5-0.7 bar was used to deposit squid ink droplets into a linear, non-linked arrangement into a portion of the coating surface. FIG. 6b shows a portion of the linear, non-linked droplets and the resulting absence of substantial smearing of the squid ink on this exemplary coating formulation. Compare this result to the result shown in FIG. 6a.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D Data-Matrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

Example 4

The following composition was produced:

| Composition #4 | |
|---|---|
| Wacker Belsil PMS MK | 2.93 grams |
| Dow Corning 249 Flake Resin | 8.85 grams |
| 2-Butanone | 60.65 grams |
| Butyl Glycolate | 6.75 grams |
| DisperBYK 181 | 0.6 grams |
| Tioxide TR92 | 20.22 grams |

Initially, the 2-butanone was mixed with the Wacker Belsil PMS MK and Dow Corning 249 Flake Resin in order to dissolve the silicone resin. Thereafter, butyl glycolate, DisperBYK 181, and Tioxide TR92 was added to the precursor mixture. The resulting formulation was mixed at 15,000-20,000 rpm for 5-10 minutes using an Ultra Turrax disperser.

After mixing, the resulting formulation was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D Data-Matrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

Example 5

Commercially available REA-JET Ceraprime ink UV WS 090 (available from REA Elektronik GmbH) was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D Data-Matrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

FIG. 7b shows strong "chalking" after firing at 500° C. for 30 min for this exemplary coating. Compare this result to the result shown in FIG. 7a where the absence of "chalking" is shown for the coating of Example 1.

Example 6

The following composition was produced:

| Composition #6 | |
|---|---|
| Wacker Belsil PMS MK | 2.93 grams |
| Dow Corning 249 Flake Resin | 8.85 grams |
| 2-Butanone | 60.65 grams |
| Butyl Glycolate | 6.75 grams |
| DisperBYK 181 | 0.6 grams |
| Iriodin 111 | 20.22 grams |

Initially, the 2-butanone was mixed with the Wacker Belsil PMS MK and Dow Corning 249 Flake Resin in order to dissolve the silicone resin. Thereafter, butyl glycolate, DisperBYK 181, and Iriodin 111 was added to the precursor mixture. The resulting formulation was mixed at 15,000-20,000 rpm for 5-10 minutes using an Ultra Turrax disperser.

After mixing, the resulting formulation was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm. Likewise, a drop-on-demand REA-JET printing system equipped with a 32-dot print heat at a pressure of 0.5-0.7 bar was used to deposit squid ink droplets into a linear, non-linked arrangement into a portion of the coating surface. FIG. 6a shows a portion of the linear, non-linked droplets and the resulting smearing of the squid ink that occurred on this exemplary coating formulation. Compare this result to the result shown in FIG. 6b.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D Data-Matrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

Example 7

The following composition was produced:

| Composition #7 | |
|---|---|
| Wacker Belsil PMS MK | 2.93 grams |
| Dow Corning 249 Flake Resin | 8.85 grams |
| 2-Butanone | 60.65 grams |
| Butyl Glycolate | 6.75 grams |
| DisperBYK 181 | 0.6 grams |
| Tiona DT-50 (anatase) | 20.22 grams |

Initially, the 2-butanone was mixed with the Wacker Belsil PMS MK and Dow Corning 249 Flake Resin in order to dissolve the silicone resin. Thereafter, butyl glycolate, DisperBYK 181, and Tiona DT-50 was added to the precursor mixture. The resulting formulation was mixed at 15,000-20,000 rpm for 5-10 minutes using an Ultra Turrax disperser.

After mixing, the resulting formulation was applied to the exterior skin of a cordierite honeycomb using a drop-on-demand REA-JET printing system equipped with a 32-dot print heat at a pressure of 0.5-0.7 bar. The average coating surface was about 2×2 inches. Without any drying or curing step, a 2D DataMatrix Code was marked using a $CO_2$ laser operating at 10.6 µm with a power output of approximately 30 Watts at a scan speed of 700 mm/s. The irradiated portions developed a dark (black) color and extremely good color contrast between the irradiated and non-irradiated portion. The resulting laser mark was fused within the cordierite and had an approximate thickness of less than 30 µm.

After the laser marking, the cordierite honeycomb was heated at between 350° C.-500° C. for approximately 30 minutes to evaluate discoloration resistance. After heating for approximately 30 minutes, the cordierite honeycomb was removed and cooled to allow an additional 2D Data-Matrix Code to be printed on the formulated coating using an inkjet printer and a thermally resistant black ink available from Squid Ink. Thereafter, the cordierite honeycomb was again heated at between 350° C.-500° C. for approximately 30 minutes to evaluate discoloration resistance. An optical reader with a noise-detection capability was used to determine the overall quality of both laser mark and inkjet printed mark.

Table 2 provides a qualitative summary of the results of testing carried out using the exemplary formulations discussed above.

TABLE 2

| | Ex. 1 | Ex. 2 | Ex. 3 | Ex. 4 | Ex. 5 | Ex. 6 | Ex. 7 |
|---|---|---|---|---|---|---|---|
| Color after 350° C. | white | white | white | white | brownish | white | slightly colored |
| Color after 500° C. | white | white | white | white | white | white | white |
| Chalking after heating at 500° C. | No | No | No | No | Yes | No | No |
| Readability of laser marked data matrix code | Good | Good | Good | Good | Good | Good | Good |
| Quality of inkjet printed data matrix code | Average | Good | Good | Good | Poor | Poor | N/A |

Following from the above description and accompanying Figures, it should be apparent to those of ordinary skill in the art that, while the methods and apparatuses herein described constitute exemplary embodiments of the claimed invention, the invention is not limited to the foregoing and changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated.

What is claimed is:

1. A ceramic article comprising:
a ceramic structure; and
a coating layer disposed on at least a portion of a surface of the ceramic structure, wherein the coating layer comprises:
a volatile solvent;
a silicone resin comprising a trifunctional unit of formula $(R)SiO_{3/2}$, wherein R is chosen, independently by trifunctional unit, from hydrocarbyl groups and hydroxyl groups, on the condition that at least one R is a hydrocarbyl group; and
titanium dioxide particles having an average size of between approximately 100 nanometers and 1000 nanometers and an aspect ratio less than or equal to 10,
wherein the titanium dioxide particles are diffused into at least one pore of the ceramic structure.

2. The article of claim 1, wherein the coating layer further comprises at least one of a dispersing agent, a wetting agent, a humectant, an anti-settling agent, an ultraviolet tracer, and a surfactant.

3. The article of claim 1, wherein the titanium dioxide particles comprise rutile crystalline titanium dioxide particles.

4. The article of claim 1, wherein the titanium dioxide particles have an average size of between approximately 200 nanometers and 300 nanometers.

5. The article of claim 1, wherein the volatile solvent is chosen from alkanols, esters, ketones, polyols, ethers, alcohols, and mixtures thereof.

6. The article of claim 1, wherein the coating layer further comprising a lesser volatile solvent having a vapor pressure an order of magnitude less than the volatile solvent.

7. The article of claim 1, further comprising an indicia marked on at least a portion of the coating layer.

8. The article of claim 7, wherein the indicia comprises a laser marking.

9. The article of claim 1, wherein the ceramic structure has a honeycomb shape, the honeycomb comprising a plurality of parallel channels.

10. The article of claim 9, wherein the ceramic structure comprises an exterior ceramic skin, and wherein the titanium dioxide particles are at least partially diffused into the exterior ceramic skin.

11. The article of claim 1, wherein the ceramic structure comprises cordierite.

12. A ceramic article comprising:
a ceramic honeycomb structure with an exterior ceramic skin,
wherein, in a coated section of the exterior ceramic skin, at least a surface of the exterior ceramic skin is coated with a coating material comprising titanium dioxide,
wherein, in a first portion of the coated section, the coating material comprises titanium dioxide particles having an average size of less than 1000 nanometers and an aspect ratio of less than or equal to 10, wherein the titanium dioxide particles are at least partly diffused into the exterior ceramic skin,
wherein a second portion of the coated section comprises titanium dioxide fused with the exterior ceramic skin, and
wherein the second portion of the coated section contrasts with the first portion of the coated section.

13. The article of claim 12, wherein the second portion of the coated section is darker in color than the first portion of the coated section.

14. The article of claim 12, wherein the second section, in contrast with the first section, comprises a mark or indicia.

15. The article of claim 12, wherein the exterior ceramic skin is comprised of cordierite.

16. The article of claim 12, wherein the titanium dioxide particles in the first portion of the coated section are disposed within a thickness of less than 30 μm.

17. The article of claim 12, wherein no titanium dioxide particles are visible in the second portion of the coated section.

18. The article of claim 12, wherein the second portion is an irradiated portion.

19. The article of claim 12, wherein the second portion is a laser irradiated portion.

20. The article of claim 12, wherein the first portion is a non-irradiated portion.

21. The article of claim 12, wherein the titanium dioxide particles comprise rutile crystalline titanium dioxide particles.

22. The article of claim 12, wherein the titanium dioxide particles have an average size of between approximately 200 nanometers and 300 nanometers.

23. The ceramic article of claim 12, wherein the coating material further comprises a silicone resin comprising a trifunctional unit of formula $(R)SiO_{3/2}$, wherein R is chosen, independently by trifunctional unit, from hydrocarbyl groups and hydroxyl groups, on the condition that at least one R is a hydrocarbyl group.

* * * * *